United States Patent [19]

Rechmeier et al.

[11] 3,843,736

[45] Oct. 22, 1974

[54] PROCESS FOR THE PRODUCTION OF VINYL CHLORIDE FROM 1,2-DICHLOROETHANE

[75] Inventors: Gerhard Rechmeier; Armin Jacobowsky, both of Knapsack near Cologne; Peter Wirtz, Cologne-Lindenthal, all of Germany

[73] Assignee: Knapsack Aktiengesellschaft, Knapsack near Cologne, Germany

[22] Filed: Mar. 2, 1970

[21] Appl. No.: 15,650

[30] Foreign Application Priority Data
Mar. 4, 1969  Germany.............................. 1910854

[52] U.S. Cl. ........................ 260/656 R, 260/654 D
[51] Int. Cl. ............................................ C07c 21/02
[58] Field of Search .................... 260/656 R, 654 D

[56] References Cited
FOREIGN PATENTS OR APPLICATIONS
1,124,874   8/1968   Great Britain ................. 260/656 R
563,838   9/1958   Canada .......................... 260/656 R

*Primary Examiner*—Howard T. Mars
*Assistant Examiner*—Alan Siegel
*Attorney, Agent, or Firm*—Connolly and Hutz

[57] ABSTRACT

In the process of producing vinyl chloride by incomplete thermal cracking of 1,2-dichloroethane at elevated pressure and at temperatures between about 450° and 650°C, in the absence of catalysts, wherein the gas mixture which leaves the cracking zone, and which consists of vinyl chloride, hydrogen chloride, unreacted 1,2-dichloroethane, and also by-products, is passed in the partly condensed stage into a first distillation stage for distilling off the hydrogen chloride and then to a second distillation stage for distilling off the vinyl chloride, whereupon the sump product of the second distillation stage is treated in known manner for the purpose of recycling the unreacted 1,2-dichloroethane and wherein the vinyl chloride drawn off at the top of the second distillation stage and condensed is partly pomped back approximately to the middle of the first distillation stage, the procedure according to the invention is as follows: the vinyl chloride which is drawn off as product and condensed, and which still contains small amounts of hydrogen chloride, is fed to the top of the degasification zone from which part of the vinyl chloride together with all of the entrained hydrogen chloride is evaporated with the aid of a circulating evaporator, condensed, and pumped back approximately to the middle of the first distillation stage provided for distilling off the hydrogen chloride, while very pure vinyl chloride is discharged from the bottom of the degasification zone.

1 Claim, 1 Drawing Figure

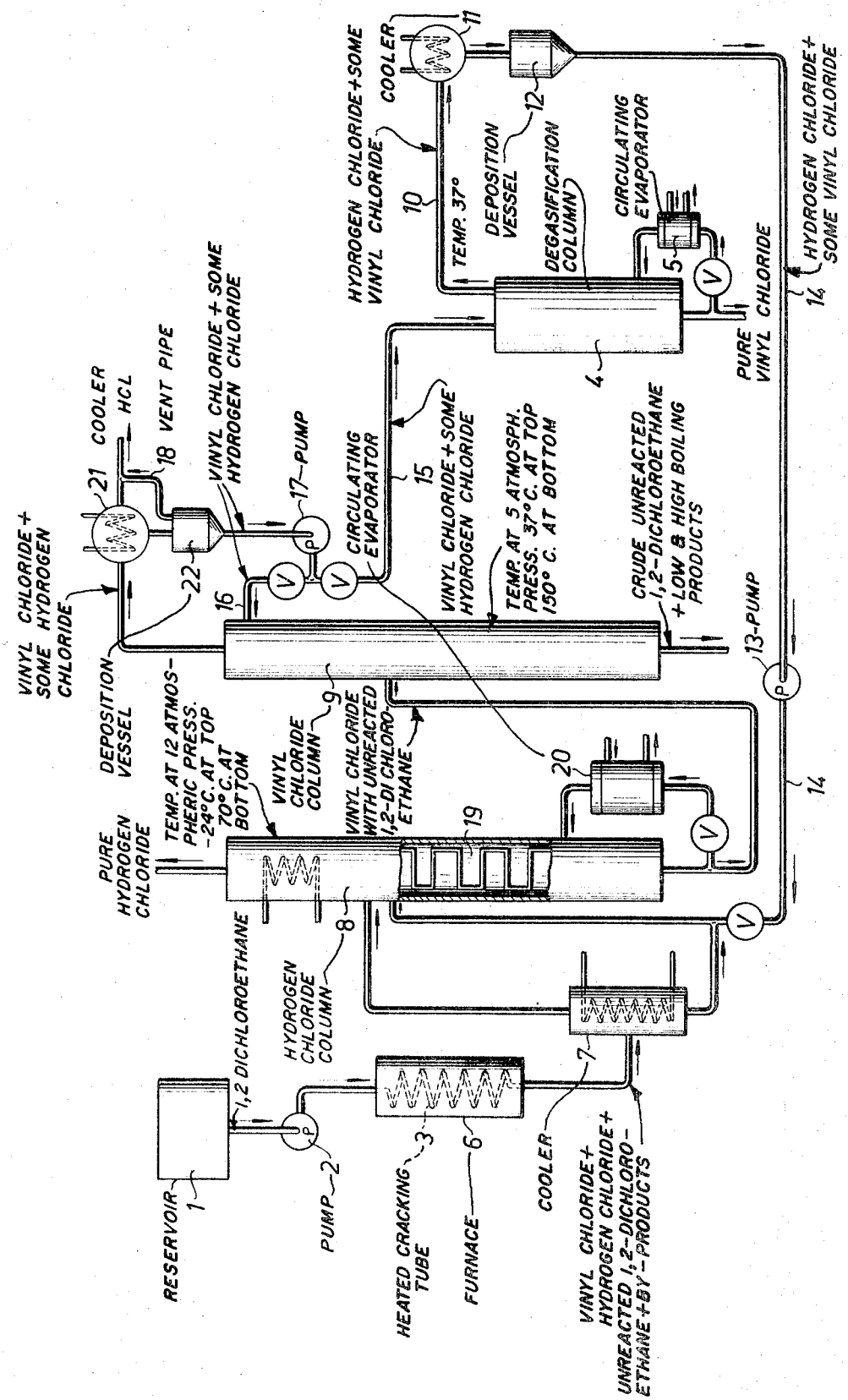

PROCESS FOR THE PRODUCTION OF VINYL CHLORIDE FROM 1,2-DICHLOROETHANE

The invention relates to a process for the production of very pure vinyl chloride, which is free from hydrogen chloride, by incomplete thermal cracking of 1,2-dichloroethane at elevated pressure and at temperatures between about 450° and 650°C, in the absence of catalysts.

Processes for the production of vinyl chloride from 1,2-dichloroethane are known for example from British Patent Specification No. 938,824 and U.S. Pat. No. 3,476,955 and U.S. Pat. No. 3,484,493.

In orther to explain the invention which will be described below, the general procedure in working with known processes for the cracking of 1,2-dichloroethane will be described in greater detail with the aid of a flow diagram.

1,2-dichloroethane is fed by a pump 2 into the cracking tube 3 from a reservoir 1. The dichloroethane is introduced into the cracking tube 3 at a pressure of for example 27 atmospheres absolute and at a rate of for example 9.38 tons per hour. The temperature of the dichloroethane introduced is about 40°C. The cracking tube 3 is situated in a furnace 6 heated with fuel oil or with gas. On its path through the cracking tube 3 the dichloroethane introduced in liquid form is first preheated, then evaporated, superheated, and finally cracked at a temperature of about 500°C. The conversion of dichloroethane in the cracking portion of the cracking tube 3 is kept at about 56 percent (generally 55 to 65 percent) by corresponding adjustment of the heating. The temperature of the gas mixture passing out of the cracking tube is 525°C, with a pressure of 17 atmospheres absolute. At this pressure the gas mixture is partly condensed by the coolers 7 at about 70°C. The fraction of the product which remains gaseous and the condensate are introduced into the hydrogen chloride column 8 with expansion to about 12 atmospheres absolute, the expulsion portion of said column being indicated at 19. The sump of the column 8 can be heated by a circulating evaporator 20. The top product obtained in this distillation stage 8 is a pure hydrogen chloride from the streams of product introduced in liquid and vapour form from the cracking process. This hydrogen chloride, the yield of which amounts to 1853 kg per hour, is suitable for other syntheses because of its high purity.

The bottom product of the column 8 contains the vinyl chloride formed in the cracking process ($BP_{760}$ = $-13.9°C$) together with the unreacted 1,2-dichloroethane. This mixture is introduced into the so-called vinyl chloride column 9 with expansion to about 5 atmospheres absolute, the pure vinyl chloride (= 3172 kg per hour) being taken from the top condensate of the column 9. The bottom product of the vinyl chloride column 9 contains the 1,2-dichloroethane which did not react in the cracking column and also the low-boiling and high-boiling products formed by this cracking process. The top temperature of the column 9 is kept at 37°C and the bottom temperature at 150°C. In order to be able to recycle this 1,2-dichloroethane to the cracking process, the sump product flowing off from the bottom of the vinyl chloride column 9 is treated in accordance with the process described in U.S. Pat. No. 3,484,493, column 3, lives 52 to column 4, line 48.

The vinyl chloride distilling off at the top of the column 9 is completely condensed in the cooler 21 and collected in the deposition vessel 22. This deposition vessel 22 has a vent pipe 18. With the aid of the pump 17, vinyl chloride is continuously drawn off from the deposition vessel 22 and part is recycled through pipe 16 to the top of column 9. Another part of the vinyl chloride can be withdrawn through the pipe 15. A recycled fraction is branched off from the resulting vinyl chloride by the process of U.S. Pat. No. 3,484,493 and fed back to the inlet of column 8.

With the recycling of vinyl chloride between columns 8 and 9 reduced carbonisation is achieved in the circulating evaporator 20 and in the expulsion part 19.

Although the vinyl chloride withdrawn from pipe 15 can be regarded as a pure product, it nevertheless still contains about 300 and 500 ppm of hydrogen chloride. In order to remove this hydrogen chloride, the liquid vinyl chloride was hitherto passed through two towers filled with sodium hydroxide. This was a non-continuous operation, since the towers had to be emptied and refilled from time to time. It was also a disadvantage that considerable amounts of sodium chloride or sodium hydroxide were in the course of time removed from the towers by the liquid vinyl chloride and entrained into the adjoining pipes, which had to be freed of this substance at regular intervals.

According to the invention, the NaOH towers can be dispensed with if the vinyl chloride containing hydrogen chloride is passed to the top of a degasification column 4, the bottom part of which is provided with a circulating evaporator 5. With the aid of this circulating evaporator part of the incoming vinyl chloride is evaporated, while the rising vapours entrain all the hydrogen chloride. The vapours are discharged through the pipe 10, condensed in the cooler 11, and collected in the deposition vessel 12. From the latter the vinyl chloride containing hydrogen chloride passes through pipe 14 for recycling to the inlet of column 8. A pump 13 is incorporated in the pipe 14, since the column 8 is generally operated at a higher pressure than the columns 9 and 4. Very pure vinyl chloride free from hydrogen chloride can be removed from the bottom outlet of column 4.

It is generally sufficient for about 5 percent of the vinyl chloride entering the degasification column 4 to be evaporated in order to discharge all the hydrogen chloride. It is however also possible for more vinyl chloride to be evaporated and recycled through pipe 14 to column 8, in which case the advantages of the process of U.S. Pat. No. 3,484,493 are additionally gained.

The method of working according to the invention permits completely continuous operation; through the elimination of the NaOH towers a saving is made in labour, which was previously necessary for emptying and refilling these towers, while in addition the vinyl chloride obtained contains no salts.

More specifically, the invention relates to a method of producing vinyl chloride by incomplete thermal cracking of 1,2-dichloroethane at elevated pressure of preferably 8 to 40 atmospheres absolute and at temperatures between about 450° and 650°C in the absence of catalysts, the gas mixture which leaves the cracking zone, and which consists of vinyl chloride, hydrogen chloride, unreacted 1,2-dichloroethane, and also by-products, being passed in the partly condensed state into a first distillation stage for distilling off the hydrogen chloride and then to a second distillation stage for distilling off the vinyl chloride, whereupon the sump product of the second distillation stage is treated in known manner for the purpose of recycling the unreacted 1,2-dichloroethane, the vinyl chloride drawn off at the top of the second distillation stage and condensed being partly pumped back approximately to the middle of the first distillation stage, this method being characterized in that the condensed vinyl chloride which is drawn off as product, and which still contains small amounts of hydrogen chloride, is fed to the top of a degasification zone from which a part of the vinyl chloride together with all the entrained hydrogen chloride is evaporated with the aid of a circulating evaporator, condensed, and pumped back approximately to the middle of the first distillation stage provided for distilling off the hydrogen chloride, while very pure vinyl chloride is removed from the bottom of the degasification zone.

The method according to the invention is preferably characterized in that 3 to 20 percent of the vinyl chloride entering at the top of the degasification zone, together with all the hydrogen chloride entrained, are evaporated from the degasification zone and condensed.

EXAMPLE 5 tons per hour of vinyl chloride containing 500 ppm (= 0.5 per thousand) of HCl are introduced through pipe 15 into the degasification column 4. With the aid of the circulating evaporator 5,5 percent (= 250 kg per hour) of the incoming vinyl chloride is evaporated, while all the hydrogen chloride, that is to say 2.5 kg per hour, is entrained through pipe 10. The evaporated vinyl chloride, now containing about 1 percent HCl, is condensed and recycled through pipe 14 to column 8. 4.750 tons per hour of very pure vinyl chloride (0 ppm HCl) are withdrawn as product from the bottom of column 4.

We claim:

1. A process for the production of vinyl chloride by incomplete thermal cracking of 1,2-dichloroethane at elevated pressure and at temperatures between about 450° and 650°C, in the absence of catalysts, in which the gas mixture which leaves the cracking zone, and which consists of vinyl chloride, hydrogen chloride, unreacted 1,2-dichloroethane, and also by-products, is partly condensed in a cooling zone and the resulting gases and condensate is passed into a first distillation stage for distilling off the hydrogen chloride; and the sump product from said first distillation stage is passed to a second distillation stage for distilling off the vinyl chloride, whereupon the sump product of the second distillation stage is distilled to recover unreacted 1,2-dichloroethane for recycle to said cracking zone; and wherein the vinyl chloride drawn off at the top of the second distillation stage is condensed; collecting said condensed vinyl chloride product from the top of the second distillation stage, said vinyl chloride containing hydrogen chloride, feeding said vinyl chloride product to a degasification zone, heating the vinyl chloride in the zone to evaporate from 3 to 20 percent of the vinyl chloride product in the zone and the entrained hydrogen chloride, condensing said evaporated vinyl chloride and hydrogen chloride and returning the condensate to the first distillation stage, and discharging from the bottom of the degasification zone purified vinyl chloride free of hydrogen chloride.

* * * * *